United States Patent [19]
Alkalay et al.
[11] Patent Number: 5,031,833
[45] Date of Patent: Jul. 16, 1991

[54] SPRINKLER

[75] Inventors: Uri Alkalay, Ra'anana; Moshe Gorney, Kibbutz Naan 73263, both of Israel
[73] Assignee: Moshe Gorney, Kibbutz Naan, Israel

[21] Appl. No.: 485,783
[22] Filed: Feb. 22, 1990

Related U.S. Application Data

[63] Continuation of Ser. No. 99,079, Sep. 21, 1987, abandoned.

[30] Foreign Application Priority Data

Sep. 21, 1986 [IL] Israel ........................ 80102

[51] Int. Cl.[5] ........................ A01G 27/00; B05B 3/16
[52] U.S. Cl. ........................ 239/68; 239/104; 239/242
[58] Field of Search ............... 239/237, 240, 242, 263, 239/263.3, 67, 68, 73, 104, 106, 112, 113

[56] References Cited

U.S. PATENT DOCUMENTS

| | | | |
|---|---|---|---|
| 2,475,537 | 7/1949 | Ashworth . | |
| 2,726,119 | 12/1955 | Egly et al. | 239/67 |
| 2,835,529 | 5/1958 | Egly et al. . | |
| 2,979,271 | 4/1961 | Boyden . | |
| 3,033,467 | 5/1962 | Hofer | 239/201 |
| 3,038,666 | 6/1962 | Dudley et al. | 239/242 |
| 3,091,399 | 5/1963 | Kennedy . | |
| 3,464,628 | 9/1969 | Ho Chow . | |
| 3,874,588 | 4/1975 | Flynn . | |
| 3,921,912 | 11/1975 | Hayes | 239/242 |
| 4,201,344 | 5/1980 | Lichte | 239/242 |
| 4,335,852 | 6/1982 | Chow | 239/68 |
| 4,624,412 | 11/1986 | Hunter | 239/240 |
| 4,625,914 | 12/1986 | Sexton et al. | 239/242 |
| 4,722,670 | 2/1988 | Zweifel | 417/198 |
| 4,773,595 | 9/1988 | Livne | 239/242 |

*Primary Examiner*—Andres Kashnikow
*Assistant Examiner*—Christopher G. Trainor
*Attorney, Agent, or Firm*—Michael N. Meller

[57] ABSTRACT

A gear driven rotary sprinkler comprising a base defining a liquid inlet, a sprinkler head which is rotatable about a rotation axis fixed in the base, liquid driven gear apparatus for driving the sprinkler head in rotation about the rotation axis, clutch apparatus for selectably decoupling the sprinkler head from the gear apparatus upon forced rotation of the sprinkler head, apparatus for limiting the speed of rotation of the sprinkler head under high pressure and/or high volume conditions, apparatus for selectably limiting the azimuth of rotation including an over-center spring mechanism, and a liquid flow pathway from the liquid inlet to the sprinkler head including suctioning apertures operative to draw sediment from the liquid driven gear apparatus by venturi action and to flush it from the sprinkler.

17 Claims, 11 Drawing Sheets

FIG 7
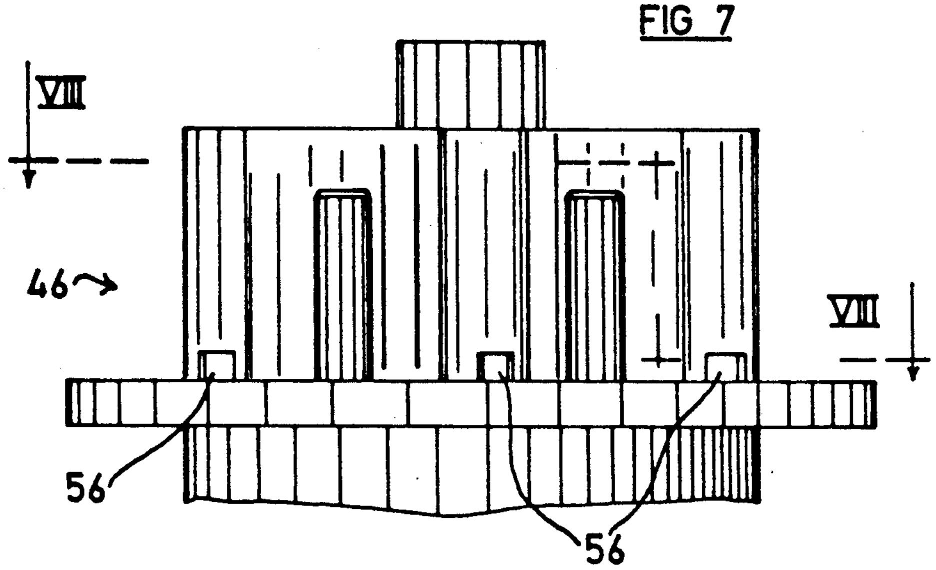
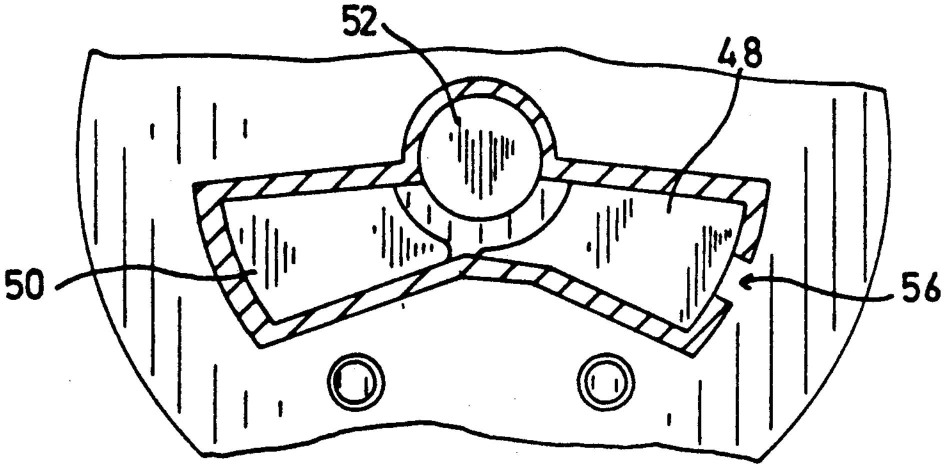
FIG 8

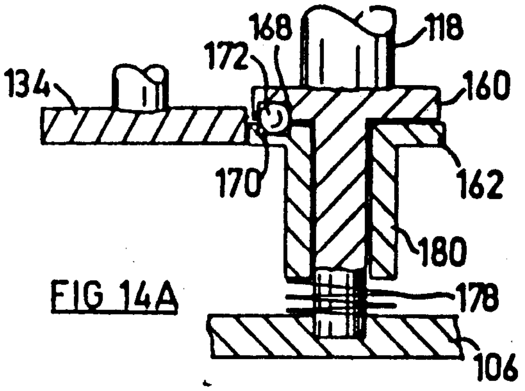
FIG 14A
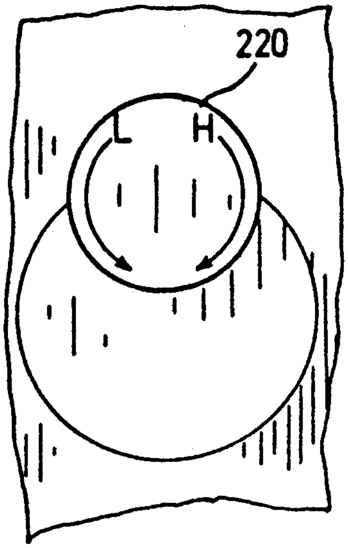
FIG 17
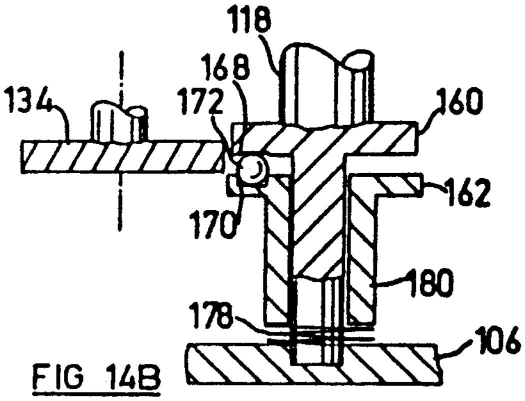
FIG 14B
FIG 15A
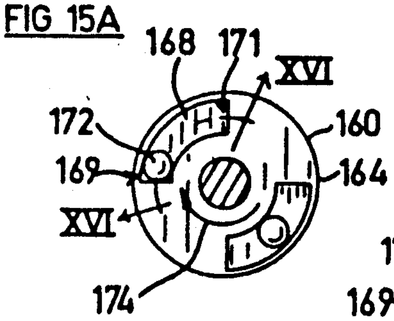
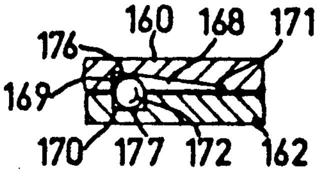
FIG 16
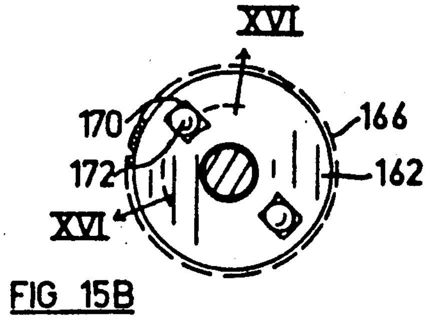
FIG 15B

SPRINKLER

This application is a continuation of application Ser. No. 99,079, filed 9/21/87 now abandoned.

FIELD OF THE INVENTION

The present invention relates to sprinklers and more particularly to rotating sprinklers including gear drives.

BACKGROUND OF THE INVENTION

Various types of gear driven rotating sprinklers are known. One disadvantage of some such sprinklers is that they are readily damaged by users forcibly orienting the sprinkler head in a given direction. Another disadvantage arises from extremely high rotation speeds which result from high input water pressures, causing premature wear of the sprinkler components. A further difficulty is the accumulation of dirt and sediment in the area of the gears, causing wear and interference with the functioning thereof.

SUMMARY OF THE INVENTION

The present invention seeks to overcome disadvantages of the prior art gear driven sprinklers and to provide a gear driven sprinkler of rugged construction and economical cost.

There is thus provided in accordance with a preferred embodiment of the present invention a gear driven rotary sprinkler comprising a base defining a liquid inlet, a sprinkler head which is rotatable about a rotation axis fixed in the base, liquid driven gear apparatus for driving the sprinkler head in rotation about the rotation axis, clutch apparatus for selectably decoupling the sprinkler head from the gear apparatus upon forced rotation of the sprinkler head, apparatus for limiting the speed of rotation of the sprinkler head under high pressure and/or high volume conditions, apparatus for selectably limiting the azimuth of rotation including an over-center spring mechanism, and a liquid flow pathway from the liquid inlet to the sprinkler head including suctioning apertures operative to draw sediment from the liquid driven gear apparatus by venturi action and to flush it from the sprinkler.

In accordance with a preferred embodiment of the invention, the apparatus for selectably limiting the azimuth of rotation comprises a joined leaf spring and flow director arranged to have two alternative positions.

In accordance with a preferred embodiment of the invention, the apparatus for selectably limiting the azimuth of rotation comprises an integrally formed leaf spring and flow director arranged to have two alternative positions.

Further in accordance with a preferred embodiment of the invention, there is provided a pressure responsive valve connected to the inlet, for preventing entry of a liquid into the sprinkler, when the pressure of the liquid is below a selected minimum pressure.

In accordance with an alternative preferred embodiment of the invention, a sprinkler assembly includes a gear driven rotary sprinkler, and apparatus for selectably limiting the cumulative volumetric flow of a liquid therethrough, wherein the limiting apparatus comprises a base defining a liquid inlet, a cover defining a liquid outlet, including apparatus for coupling to a liquid inlet of the rotary sprinkler, a driven volume control element having first and second engagement portions, a driving element adapted to cause partial rotation of the driven element, when brought into contact with the first engagement portion thereof, causing a predetermined partial angular displacement thereof, corresponding to a partial volumetric flow of liquid through the assembly, valve apparatus associated with the driven element and the liquid inlet, configured to permit passage of the liquid through the liquid inlet for the duration of the contact between the driving element and the first engagement portion, and further configured not to permit passage of the liquid through the second inlet for the duration of contact between the driving element and the second engagement portion, a gear assembly for activating the driving element, an intermediate rotational element disposed between the liquid driven gear apparatus and the gear assembly, and including clutch apparatus disposed between the intermediate element and the gear assembly, adapted to drive the gear assembly when the rotational element is rotated in one direction, and adapted not to drive the gear assembly when the rotational element is rotated in an opposite direction, and selector apparatus connected to the driven element in fixed relation therewith, for limiting a volume of liquid to be passed through the assembly.

BRIEF DESCRIPTION OF THE DRAWINGS

The present invention will be understood and appreciated more fully from the following detailed description taken in conjunction with the drawings in which:

FIG. 7 is a pictorial side view illustration of a liquid pathway defining element forming part of the apparatus of FIG. 1;

FIG. 8 is a sectional illustration taken along the lines VIII—VIII in FIG. 7;

FIGS. 14A and 14B are partially cut away views of clutch apparatus shown in FIG. 10, in engaged and disengaged modes, respectively;

FIGS. 15A and 15B are bottom and top views of respective engagement surfaces of clutch apparatus shown in FIGS. 14A and 14B;

FIG. 16 is a composite cross-sectional view taken along line XVI—XVI in FIGS. 15A and 15B; and FIG. 17 is a view taken in the direction indicated by line XVII—XVII in FIG. 10.

DETAILED DESCRIPTION OF A PREFERRED EMBODIMENT

Figure 1:
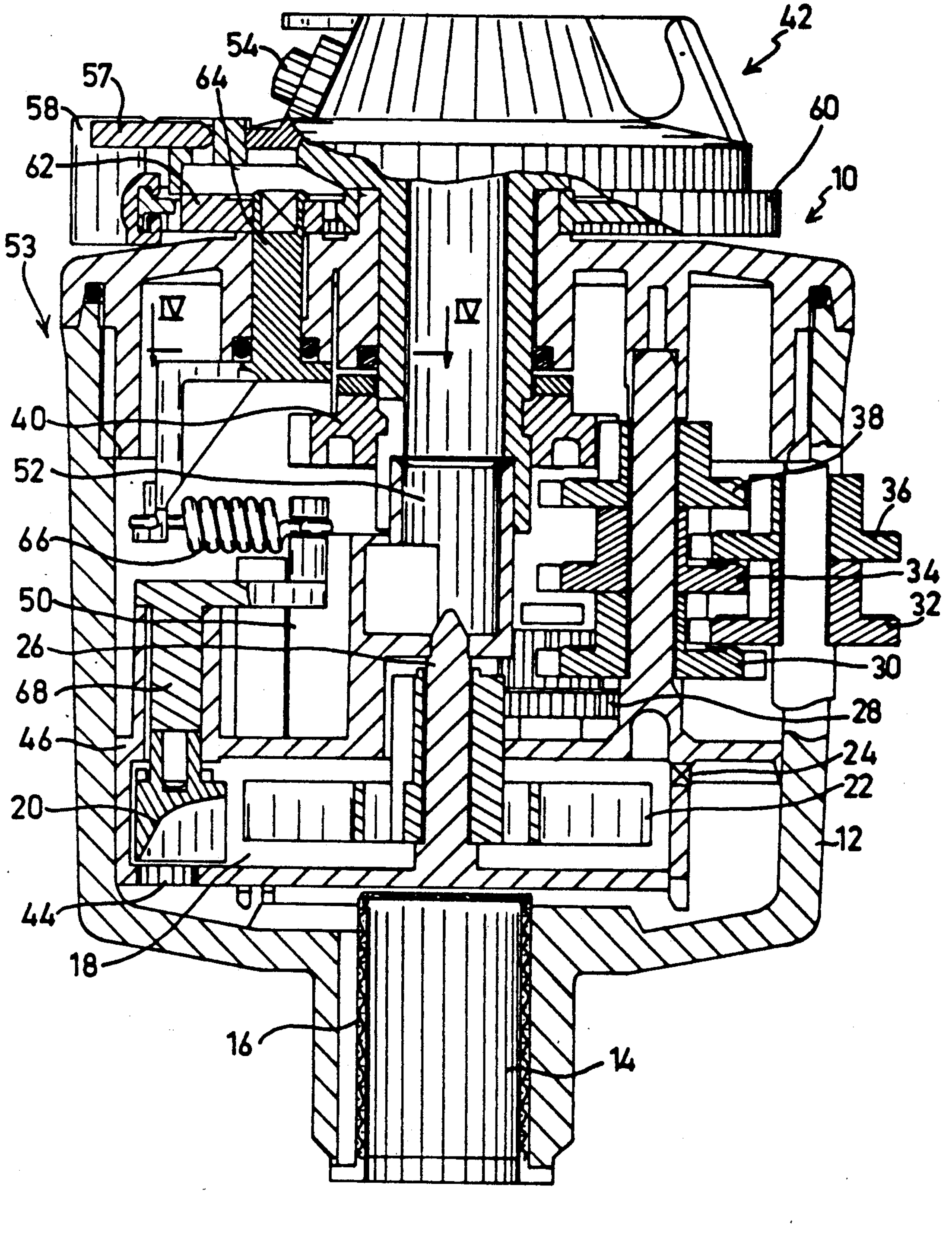
FIG. 1 is a sectional illustration of a sprinkler constructed and operative in accordance with a preferred embodiment of the present invention.
Figure 2:
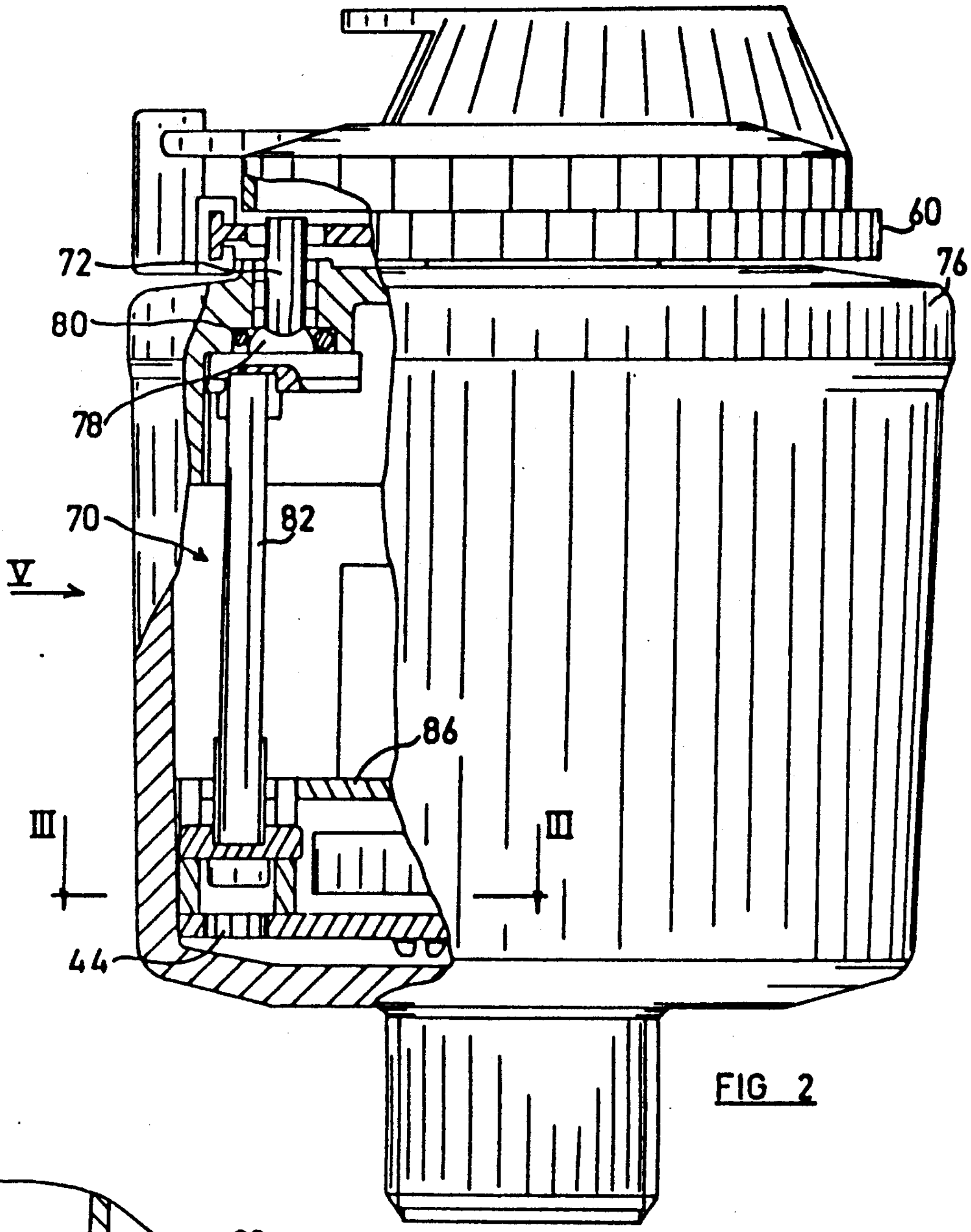
FIG. 2 is a partially cut away side view illustration of a sprinkler constructed and operative in accordance with an alternative embodiment of the present invention.
Figure 3:
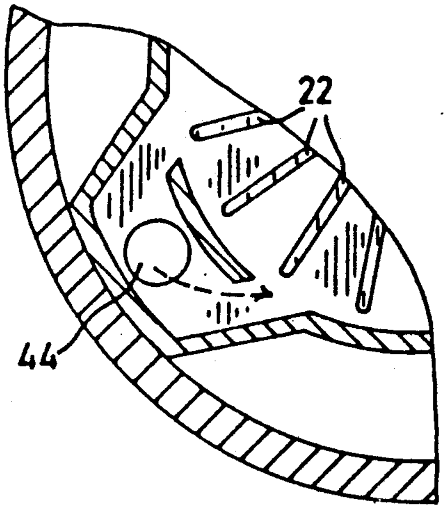
FIG. 3 is a sectional illustration of the apparatus of FIG. 2 taken along the lines III—III in FIG. 2.

Reference is now made to FIGS. 1, 4A and 4B, 6A and 6B, 7 and 8 which illustrate a gear driven rotary sprinkler constructed and operative in accordance with a preferred embodiment of the present invention. The sprinkler, indicated generally by reference numeral 10 comprises a base 12 defining a water inlet 14 having formed therein a filter screen 16.

Water from the water inlet 14 is supplied to a turbine driving chamber 18 via a driving direction determining deflector 20, for drivingly engaging a turbine 22 in a selected direction determined by deflector 20. According to a preferred embodiment of the invention, water may also enter the driving chamber in such a way as not to provide driving of the turbine 22, via a pressure responsive valve 24. One example of such a valve is a spring biased barrier, which opens to an extent determined by the pressure exerted thereon.

The function of valve 24 is to provide a pressure responsive bypass which is operative to allow water at high pressure and/or volume to pass through the sprinkler without adding to the rotation speed of the turbine, thereby avoiding the deleterious effects associated with excessive rotational speeds which would occur otherwise and enabling control of the speed of rotation of the sprinkler.

Turbine 22 rotates about a spindle 26 and is coupled via a series of six gears, 28, 30, 32, 34, 36 and 38, to a collar drive element 40, which frictionally engages a rotatable sprinkler head assembly 42. It is a particular feature of the present invention that the engagement between drive element 40 and sprinkler head assembly 42 is clutch like, such that manual movement of the sprinkler head does not damage the gearing.

The water from inlet 14 reaches driving chamber 18 via one or more apertures 44 and deflector 20 and is supplied therefrom via a liquid pathway defining a head supporting member 46. Member 46 is illustrated clearly in FIGS. 7 and 8. Referring now specifically to FIGS. 7 and 8, it is seen that the liquid flow passes via side conduits 48 and 50, through a central passageway 52 to the interior of sprinkler head assembly 42 and exits therefrom via a nozzle 54.

It is a particular feature of the present invention that side conduits 48 and 50 are formed with suctioning apertures 56, which enable sediment in the region of gears and the interior of the sprinkler generally to be suctioned into the passageway 52 and flushed out via nozzle 54. The suction is produced by the well-known venturi effect due to the flow of liquid through conduits 48 and 50.

Selectable control of the azimuthal limits of rotation of the sprinkler head assembly 42 is provided by a limiting assembly generally indicated by reference numeral 53. Sprinkler head assembly 42 is provided with a retractable engagement finger 57 which engages a pair of manually positionable azimuth indicator elements 58 and 59, mounted onto a ring 60, at the limits of the selected azimuth. Elements 58 and 59 are arranged for operative engagement via ring 60 with an element 62, which is coupled to or integrally formed with a link 64.

Link 64 is coupled to one end of a tension spring 66, whose other end is coupled to a further link 68, which, in turn, is coupled to or integrally formed with deflector 20.

The above-described arrangement, which operates in an over-center spring orientation, allows the deflector 20 to be shifted to change the direction of sprinkler head movement when the azimuth limit is reached. It is a particular feature of the invention, that the elements 58 and 59 provide a visible indication of the azimuthal limits.

Figure 4B:
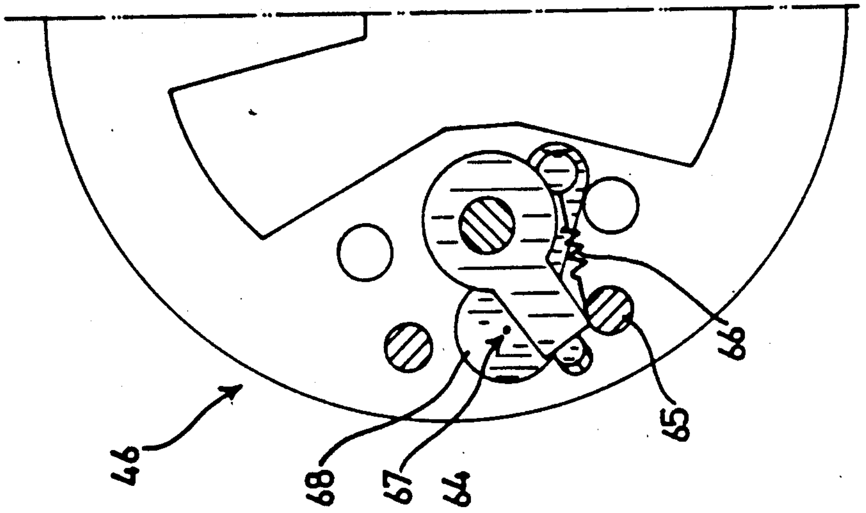
FIGS. 4A and 4B are illustrations of two operative orientations of the azimuth limiting apparatus shown in FIG. 1 taken along the line IV—IV in FIG. 1.
Figure 4A:
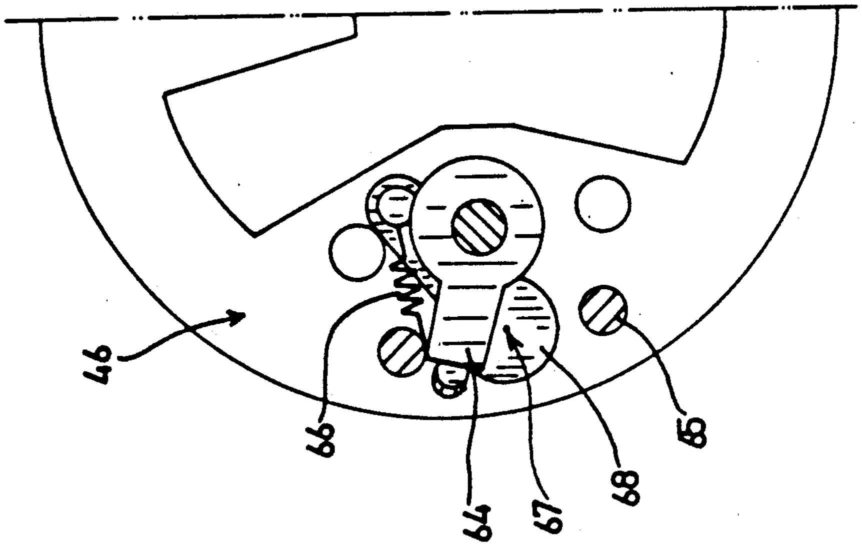

Reference is now made to FIGS. 4A and 4B, which illustrate the two operative orientations of the limiting assembly 53. FIG. 4A illustrates the orientation of the assembly 53 corresponding to the orientation shown in FIG. 1, i.e. counterclockwise rotation in the sense of FIG. 6B. When element 57 engages element 59, it causes rotation of ring 60 in a counterclockwise direction. This causes member 62 to rotate, causing rotation of link 64 in a counterclockwise direction until link 64 engages a stop 65. As link 64 passes the center 67 of link 68, spring 66 causes member 64 to snap into the orientation shown in FIG. 4B, thus reorienting deflector 20, producing an oppositely directed flow of liquid for driving engagement with turbine 22 in an opposite direction from that shown in FIG. 1.

Reference is now made to FIGS. 2, 3, 5A and 5B which illustrate an alternative embodiment of sprinkler limiting assembly 46. The remaining parts of the sprinkler are substantially identical to those shown in FIG. 1 and are identified by the same reference numerals.

Figure 5B:
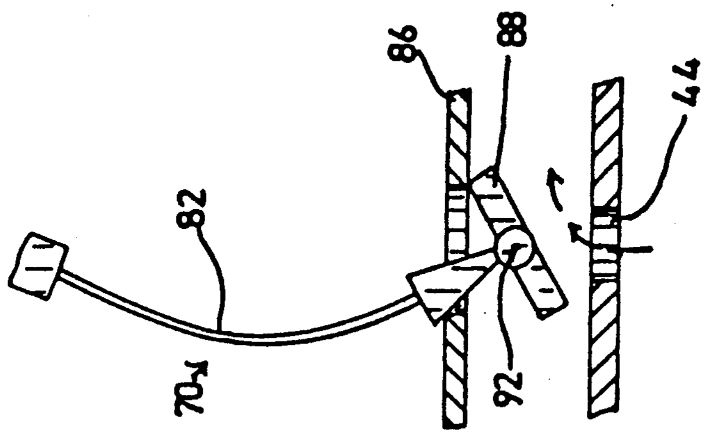
FIGS. 5A and 5B are general illustrations of two operative orientations of the azimuth limiting apparatus shown in FIG. 2 in a direction indicated by numeral V in FIG. 2.
Figure 5A:
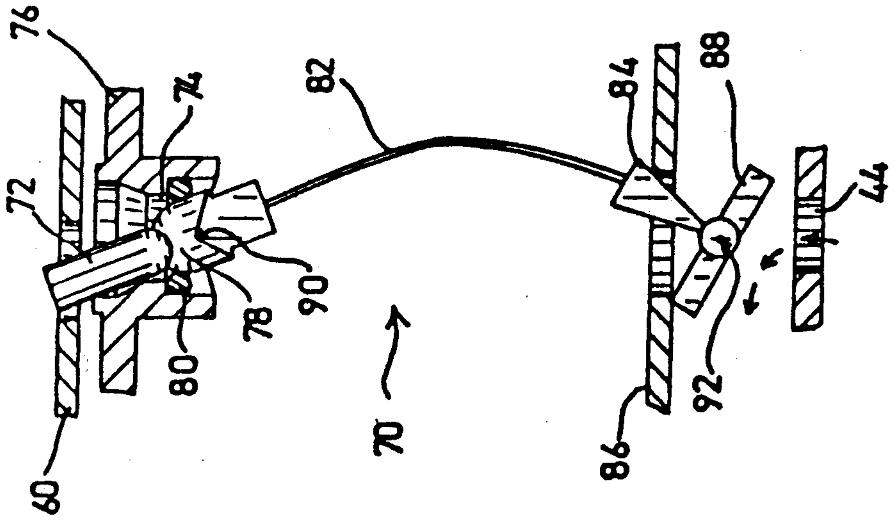
Figure 6A:
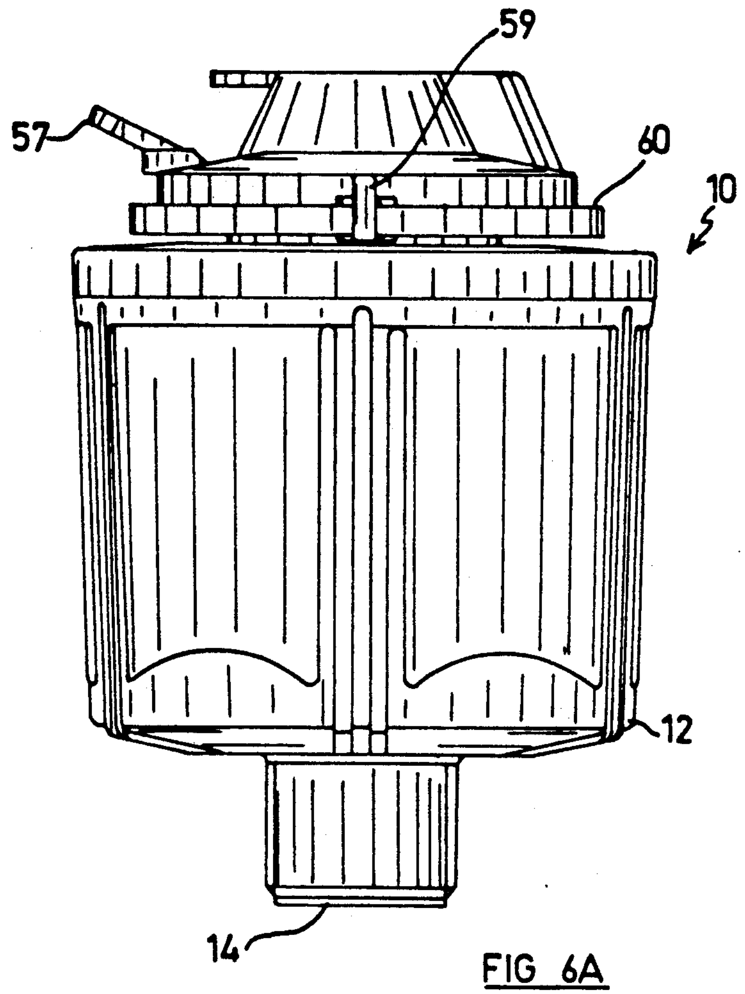
FIGS. 6A and 6B are respective side and top pictorial illustrations of the sprinkler of FIG. 1.
Figure 6B:
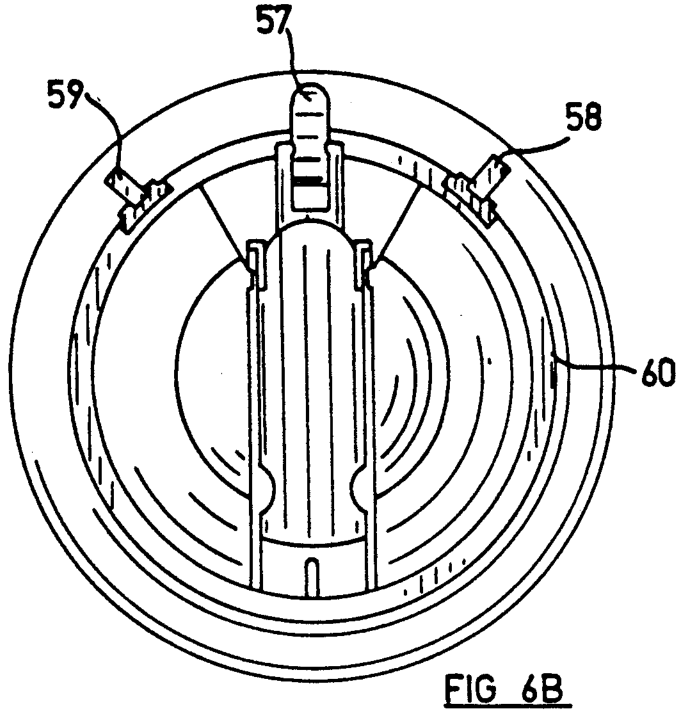

In this embodiment element 62, links 64 and 68, and deflector 20 may be replaced by a unitary or composite element 70. FIGS. 5A and 5B illustrate the two operative orientations of element 70. Element 70 comprises a driven portion 72, which is selectably positioned by the ring 60. Driven portion 72 is pivotably and sealingly seated in a socket 74 formed in a housing element 76, and is formed with a curved portion 78 which engages an O-ring 80 disposed in socket 74.

The driven portion 72 is joined to one end of a leaf spring portion 82, whose opposite end is joined to a positioning portion 84, which engages an aperture formed in a structural element 86, which corresponds to element 46 described above in the embodiment of FIG. 1. Positioning portion 84 terminates in a flow director 88, upon which impinges a pressurized flow of water via aperture 44. The direction of deflection of the water impinging on flow director 88 determines the direction of rotation of turbine 22.

It is noted that the driven portion 72 is rotatably supported for rotation about an axis 90 defined within the body of the sprinkler. The axis 90 is preferably defined by the edge of a triangular support to prevent buildup of sediments thereon, which could otherwise interfere with the operation thereof.

It is noted that the flow director is rotatably supported for rotation about an axis 92 defined within the body of the sprinkler. The axis 92 is preferably defined by the edge of a triangular support to prevent buildup of sediments thereon, which could otherwise interfere with the operation thereof.

Reference is now made specifically to FIGS. 5A and 5B, which illustrate the two operative orientations of element 70. FIG. 5A illustrates the orientation of the element 70 corresponding to the orientation shown in FIG. 2, i.e. counterclockwise rotation in the sense of FIG. 6B. When element 57 engages element 59, it causes rotation of ring 60 in a counterclockwise direction. This causes portion 72 to move to the right, in the sense of FIG. 5A, causing rotation of the curved portion 78 until leaf spring 82 snaps to the orientation shown in FIG. 5B, thus reorienting flow director 88, producing an oppositely directed flow of liquid for driving engagement with turbine 22 in an opposite direction from that shown in FIG. 2.

Figure 9:
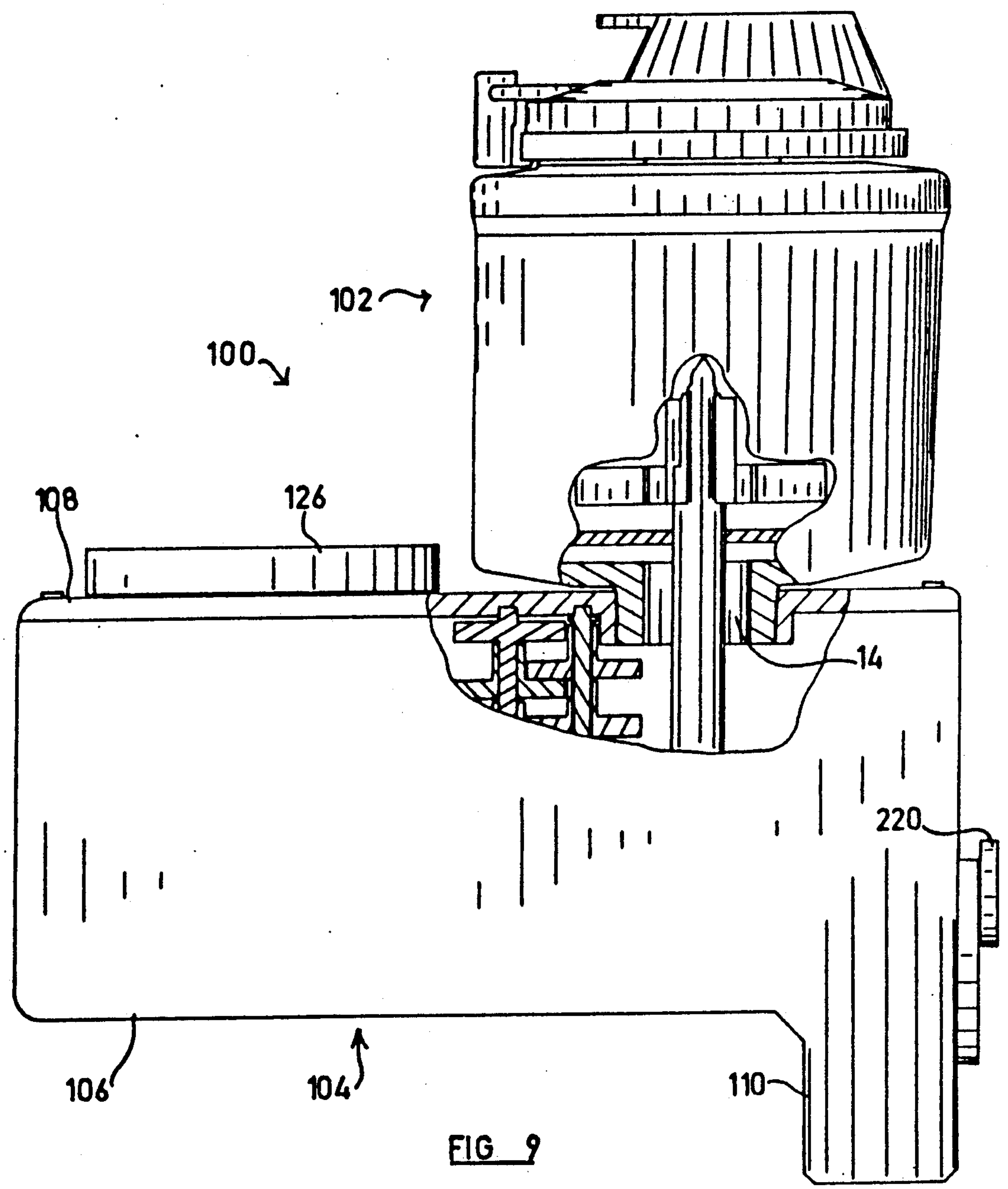
FIG. 9 is a partially cut away side view of a sprinkler, designed and constructed in accordance with an embodiment of the invention, and including volumetric flow control apparatus.

Referring now to FIG. 9 there is shown a sprinkler assembly, referenced generally 100, including a sprinkler, shown generally at 102, and cumulative volumetric flow control apparatus, referenced generally 104, coupled to sprinkler 102.

Sprinkler 102 may be constructed in accordance with either of the sprinklers designed in accordance with the invention as shown and described above in conjunction with FIGS. 1 to 8. Therefore, except where sprinkler 102 differs in construction from either of the embodiments indicated at reference numeral 10 in FIGS. 1, 2, 6A and 6B, and as described above in conjunction therewith, it will not be described in detail hereinbelow.

Figure 10:
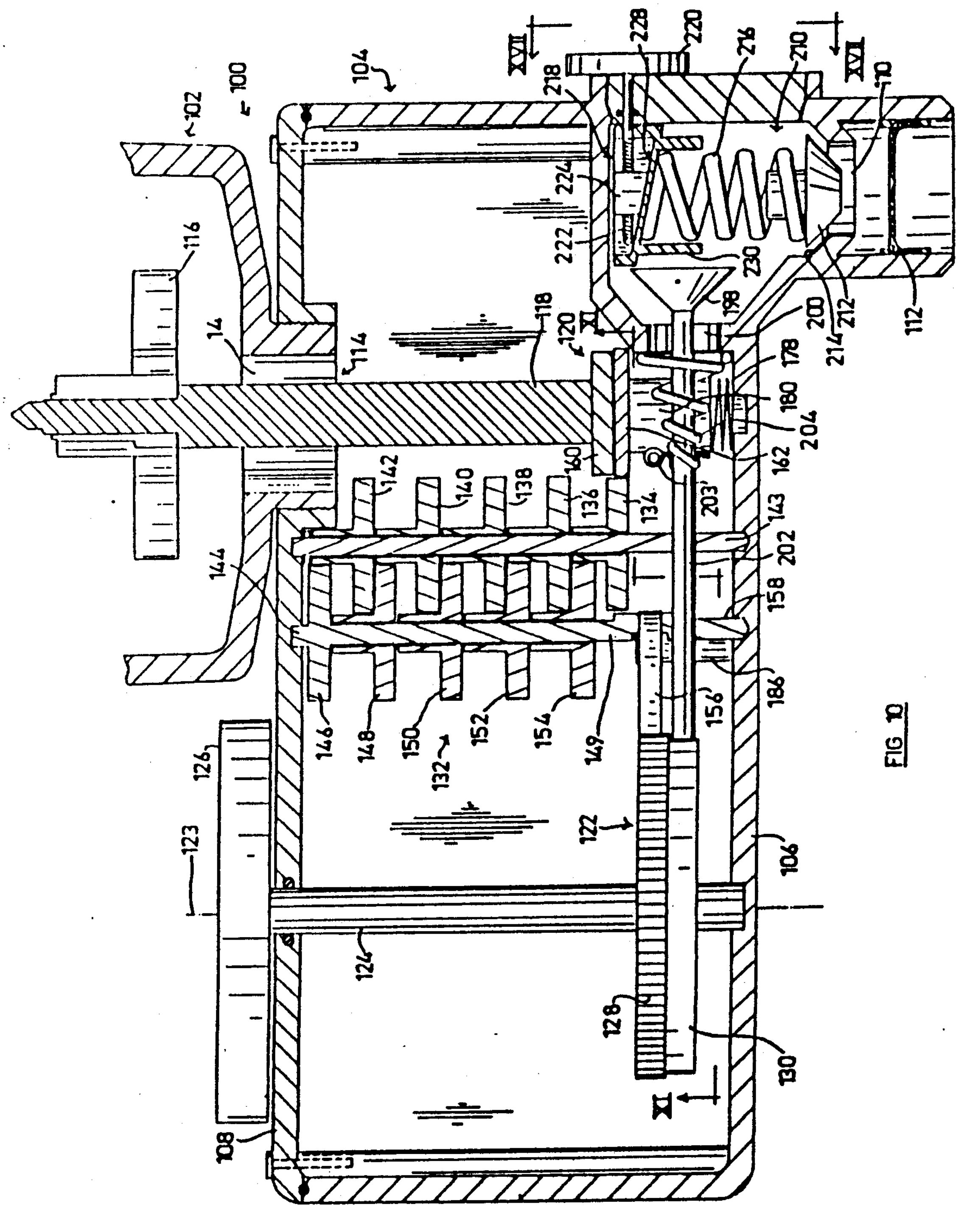
FIG. 10 is a partial cross-section of the control apparatus shown in FIG. 9.

Referring additionally to FIG. 10, apparatus 104 comprises a watertight housing including a base 106 and a cover 108. Defined within base 108 is a liquid inlet 110, including a filter screen 112. A liquid outlet 114 is defined within cover 108, and includes means for coupling to liquid inlet 14 of sprinkler 102.

A turbine, shown by reference numeral 116, corresponds to turbine 22 (FIG. 1) and may be identical thereto, and is formed with an axial spindle 118 which extends downward, through liquid inlet 14 and liquid outlet 114, info the interior of apparatus 104, and terminates in a clutch assembly, referenced generally 120.

Figure 11:
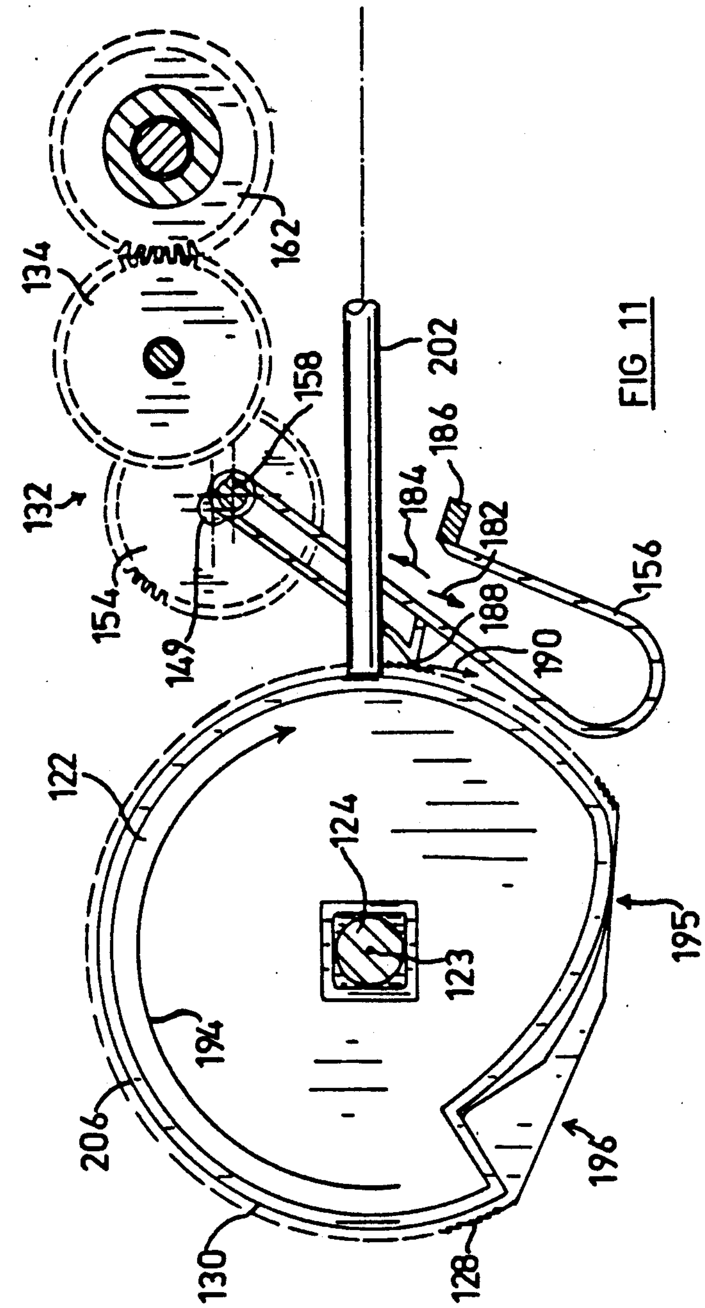
FIG. 11 is a cross-section taken along line XI—XI in FIG. 10.
Figure 12:
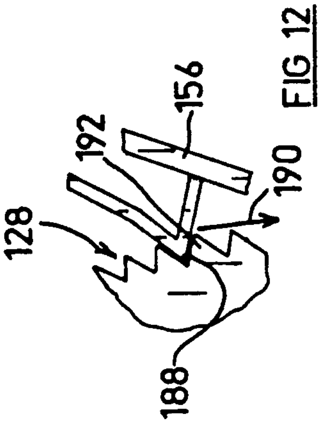
FIG. 12 is an enlargement of a portion of FIG. 11.

Referring additionally to FIG. 11, clutch assembly is arranged to provide selective rotation of an adjacent gear assembly 132, which is arranged to cause rotation of a disk-like volume control element 122, by which a total volume of a liquid being passed through sprinkler assembly 100 may be limited.

Figure 13:
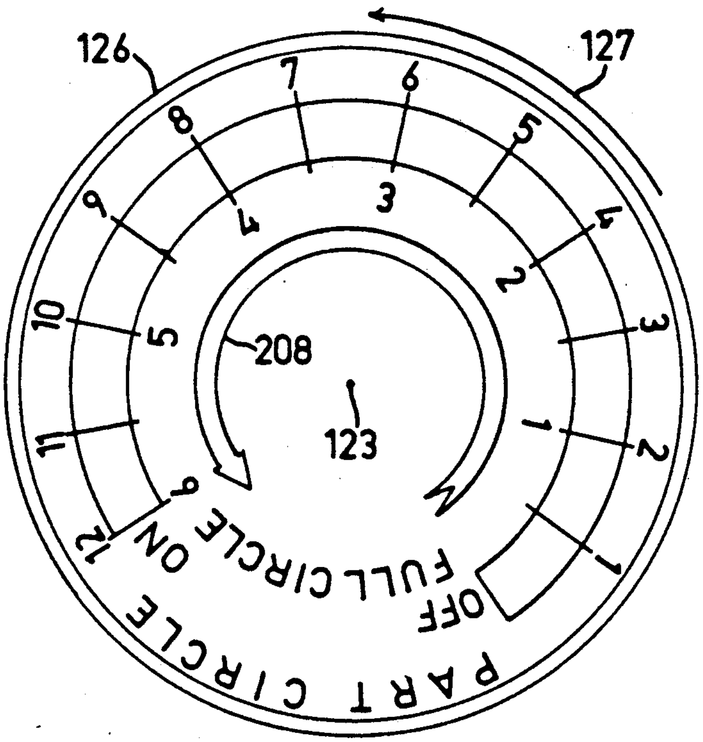
FIG. 13 is a top view of a volume selector shown in FIG. 10.

Element 122 is arranged to rotate about an axis 123, and is connected in fixed relation to a volume selector 126, a top view of which is shown in FIG. 13, by means of a spindle 124, which is coaxially aligned with axis 123. Element 122 defines an upper, mainly serrated, peripheral surface, referenced 128, and a lower, generally smooth, peripheral surface, referenced 130.

Clutch assembly 120 communicates with volume regulation element 122 by way of a gear assembly 132, which comprises (a) a first plurality of toothed wheels referenced 134, 136, 138, 140, 142, respectively, which are rotatably mounted on a spindle 143;

(b) a rotation element 144 defining a toothed wheel portion 146 and a spindle portion 149, formed generally at right angles to toothed wheel portion 146; and (c) a second plurality of toothed wheels referenced 148, 150, 152 and 154, respectively, which are rotatably mounted on spindle portion 149 of rotation element 144, and a spring element 156, eccentrically mounted in relation to spindle portion 149, being mounted on a cranked portion, 158, thereof.

Clutch assembly 120 is generally configured to cause rotation of gear assembly 132 and element 122 when being rotated in one direction, and not to cause rotation thereof when being rotated in the opposite direction.

As shown, particularly in FIGS. 14A-15B, clutch assembly 120 comprises a pair of upper and lower engagement elements, referenced 160 and 162 respectively. Upper element 160 has a smaller diameter than lower element 162 and has a generally smooth peripheral portion 164, while lower element 162 comprises a toothed periphery 166, which is configured for engagement with toothed wheel 134.

Both of elements 160 and 162 are mounted on a narrowed portion of spindle 118, element 160 being mounted in fixed relation therewith, and element 162 being mounted in rotational relation therewith. Defined in the downward facing face of upper element 160 are typically two recessed portions 168, which, as shown in FIG. 16, have trapezoidal cross-sectional configurations, having deep and shallow ends, referenced 169 and 171, respectively. Defined in the upward facing face of lower element 162 are typically two recessed portions 170, rotationally aligned with recessed portions 168.

A single ball bearing 172 is provided between each pair of recessed portions, 168 and 170. When spindle 118 is rotated so as to cause rotation of upper element 160 in the direction shown by arrow 174 in FIG. 15A, bearing 172 is pushed against wall 176 of recess 168. As wall 176 has a generally perpendicular orientation relative to the plane of rotation of element 160, the rotational force is transferred, through bearing 172 to an opposing wall of recess 170 of lower element 162, thus causing rotation of element 162, and also causing the rotation of toothed wheel 134, as shown in FIG. 14A.

When, however, upper element 160 is rotated in a direction opposite to that shown by arrow 174, relative progress of bearing 172 towards shallow 171 of recessed portion 168 occurs. A force, generally non-coplanar relative to the plane of rotation is thus exerted, through bearing 172, onto lower element 162.

The force exerted on a bottom surface 177 of recess 170 causes the axial movement of lower element 162 towards base 106, and compresses a spring, 178, which is located between a downward extension 180 of lower element 162 and base 106. As shown in FIG. 14B, the axial movement of lower element 162 in a direction causing compression of spring 178 results in disengagement of toothed periphery 166 of element 162 from toothed wheel 134, such that although spindle 118 and upper element 160 continue to rotate, toothed wheel 134 and associated gear assembly 132 do not rotate.

It will be appreciated by persons skilled in the art that, the configuration of clutch assembly 120 as shown in FIGS. 10 and 14A-15B, and as described in conjunction therewith, is for exemplary purposes only, and is not intended to limit in any way the use of alternative clutch apparatus in this context.

The operation of the volumetric flow control apparatus 104 will now be described with respect to FIG. 10. In operation, turbine 116 is rotated as described above with respect to turbine 22 depicted in FIG. 1. When rotation of turbine 22 is effected, if the direction of rotation thereof corresponds to that indicated by arrow 174 in FIG. 15A, toothed element 162 effects rotation of toothed wheel 134, causing successive rotation of toothed wheels 154, 136, 152, 138, 150, 140, 148 and 142 respectively, the transfer of rotation between any two wheels being effected between a relatively large diameter toothed portion and a relatively small diameter toothed portion.

The rotation of toothed wheel 142 causes rotation of toothed portion 146 of rotation element 144, thereby causing rotation of spindle portion 149. Cranked portion 158 of spindle 149 is then rotated, by the rotation of spindle 149, which in turn causes a cyclical movement of a driving finger 188 which forms part of spring element 156, as indicated by arrows 182 and 184, respectively, in FIG. 11. It will be appreciated that arrows 182 and 184 merely represent the directions of the motion and not its location. In fact, the motion represented by arrow 182 is illustrated in exxagerated form by tangent 190.

A fixed stop 186 is typically mounted on base 106 and is operative to continually urge driving finger 188 into engagement with the teeth of element 122.

It may thus be appreciated that each rotation of cranked portion 158 produces engagement of one tooth of element 122 and causes corresponding partial rotation of element 122 in a direction indicated by arrow 194, which causes a corresponding rotation of selector 126 (FIG. 13) in a direction indicated by arrow 127.

When element 122 is manually located such that an untoothed portion 195 of element 122 is engaged by finger 188, the motion of finger 188 does not produce any corresponding rotation of element 122. This orientation corresponds to a situation wherein the volumetric flow control apparatus 104 is not in operation and does not control the volume of water passing through the sprinkler. Such an orientation is indicated by a setting of the sprinkler on ON, as shown in FIG. 13.

A spring-loaded valve element 198 passes through a liquid inlet 200 and includes a rod 202, which is oriented along a longitudinal axis typically passing through axis 123 and abuts smooth portion 130 of element 122. A spring 204 is arranged about rod 202, and is retained thereabout by a pin, 203, engaging through both spring 204 and rod 202. Spring 204 generally urges valve element 198 towards a position closing liquid inlet 200. As element 122 is rotated, as described above, a circular portion 206 of smooth portion 130 applies an axial force to rod 202 in the direction of element 198, causing inlet 200 to remain open.

As element 122 is rotated, and rod 202 leaves circular portion 206 and abuts, instead, an indented portion of element 122, referenced 196, the force applied by spring 204 causes the axial movement of rod 202 and valve element 198 towards element 122, causing closure of liquid inlet 200 by element 198.

With reference now to FIG. 13, it will be appreciated that the numbered region shown on selector 126 generally corresponds to circular portion 206 of element 122, and is arranged in alignment therewith. This enables the selector to be rotated in a direction as shown by arrow 208, for setting a maximum volume of a liquid that may be passed through assembly 100. When a set volume of a liquid has passed through assembly 100, corresponding to rod 202 leaving serrated portion 128 of element 122 and abutting instead indented portion 196 thereof, inlet 200 is closed, thus preventing any further flow through assembly 100.

It will be appreciated by persons skilled in the art that, as the speed of rotation of turbine 116 is determined by the flow rate of a liquid through sprinkler 102, the speed of rotation of element 122 is also determined thereby, and selector 126 therefore gives an indication of the cumulative volume of liquid that has passed through sprinkler 102, regardless of the flow rate thereof.

A 'part circle' scale indicated on selector 126 shows numerical indications double those of a 'full circle' scale, also indicated thereon. When part circle irrigation is carried out, this enables irrigation by sprinkler 102, of an area defined by radii subtending an angle at the sprinkler of less than 360°. In such a case, sprinkler 102 irrigates in 'cycles', a single cycle comprising the rotation of sprinkler head assembly 42, (FIG. 1), first in one direction, through a selected angle, then in the opposite direction, returning to its position at the start of the cycle. It is appreciated that the back and forth motion in the 'part circle' mode may take place over an angle greater than or equal to 360 degrees.

As described above, however, due to clutch assembly 120, (FIG. 10), rotation of element 122 is effected only in one direction. Similarly, indication of a given volume of liquid having passed through sprinkler assembly 100 is only provided by irrigation, and corresponding rotation of sprinkler head assembly 42 in one direction, and although in the opposite direction irrigation may also be carried out, no indication is provided thereof.

Therefore, although the volume of liquid passing through sprinkler assembly 100 for a given angle of full circle rotation of sprinkler 102 is equal to the volume of liquid passing through sprinkler assembly 100 during a complete cycle of part circle irrigation where sprinkler head assembly 42 rotates in one direction through an angle equal to half of the given full circle rotation, as an indication for the part circle rotation is received only in one direction of rotation, the indication for the part circle rotation will actually be half that of the indication for the full circle rotation. In order to compensate for this, the part circle scale is double that of the full circle.

With reference to FIGS. 10 and 17, indicated generally by reference numeral 210 is a pressure responsive valve. Valve 210 typically comprises a head 212 configured for sealing engagement with a truncated cone shaped protrusion 214 of liquid inlet 110. A spring, 216, normally maintains engagement of head 212 with an inner surface of protrusion 214. The provision of valve 210 ensures that only a a liquid flowing at a minimum pressure is allowed to enter sprinkler assembly 100. A screw mechanism 218 provides manual selection of the minimum pressure required to permit entry of a liquid into sprinkler assembly 100.

A pressure selector 220 is attached to a partially threaded spindle 222, on which is located a nut 224, which is arranged for travel along an inclined surface 228 of a spring support element 230. According to the shown embodiment, as selector 220 is turned in a clockwise direction, nut 224 is forced up the incline of surface 228, thereby compressing spring 216, and increasing the minimum required pressure of liquid wishing to enter sprinkler assembly 100.

As selector 220 is turned in an anticlockwise direction, however, nut 224 is forced down the incline of surface 228, thereby decompressing spring 216, and decreasing the minimum required pressure of liquid wishing to enter sprinkler assembly 100.

It is a particular feature of the present invention that a low pressure cut off switch is provided, thus preventing operation of the sprinkler at insufficient pressures. The combination of a low pressure cut off switch with a volumetric flow control as in the present invention, ensures that when sufficient pressure is again available, the remaining indicated volume of water will be dispensed by the sprinkler under acceptable pressure conditions.

According to an alternative embodiment of the present invention, the voumetric flow control apparatus may be directly coupled to the sprinkler head drive instead of to the turbine, as illustrated, thus eliminating the requirement for duplicate reducing gearing.

According to a further alternative embodiment of the invention, the direction change apparatus may be downstream of the turbine, by employing conventional gear direction change mechanisms.

It will be appreciated by persons skilled in the art that the present invention is not limited by what has been particularly shown and described hereinabove. Rather the scope of the present invention is defined only by the claims which follow:

We claim:

1. A gear driven rotary sprinkler comprising:
a base defining a liquid inlet;
a sprinkler head which is rotatable about a rotation axis fixed in the base;
liquid driven gear means for driving the sprinkler head in rotation about the rotation axis;
clutch apparatus for selectably decoupling the sprinkler head from the gear apparatus upon forced rotation of the sprinkler head;
means for limiting the speed of rotation of the sprinkler head under high pressure conditions;
means for selectably limiting the azimuth of rotation including an over-center spring mechanism; and
a liquid flow pathway from the liquid inlet to the sprinkler head including suctioning apertures operative to draw sediment from the liquid driven gear apparatus by venturi action and to flush it from the sprinkler.

2. Apparatus according to claim 1, and wherein said means for selectably limiting the azimuth of rotation comprises a joined leaf spring and flow director arranged to have two alternative positions.

3. Apparatus according to claim 2 and wherein said joined leaf spring and said flow director are integrally formed.

4. Apparatus according to claim 3, and also including a pressure responsive valve connected to said inlet, for preventing entry of a liquid into said sprinkler when the pressure of said liquid is below a selected minimum pressure.

5. Apparatus according to claim 4 further comprising means for selectably limiting the accumulated volumetric flow of liquid through said sprinkler assembly.

6. Apparatus according to claim 5, wherein said means for selectably limiting the accumulated volumetric flow including valve means driven by said liquid driven gear means for driving the sprinkler head.

7. Apparatus according to claim 6, further comprising clutch means for accommodating single direction rotation of the sprinkler during part circle operation, said clutch means being associated with said liquid driven gear means.

8. A gear driven rotary sprinkler comprising:
a base defining a liquid inlet;
a sprinkler head which is rotatable about a rotation axis fixed in the base;
liquid driven gear means for driving the sprinkler head in rotation about the rotation axis; and
means for selectably limiting the azimuth of rotation including an over-center spring mechanism including an integrally formed, fixedly joined leaf spring and flow director arranged to have only two discrete alternative positions, wherein said leaf spring has a longitudinal axis and is bendable over said longitudinal axis so as to cause said flow director to be incapable of assuming a position other than one of said two alternative discrete positions.

9. Apparatus according to claim 8, and also including a pressure responsive valve connected to said inlet, for preventing entry of a liquid into said sprinkler when the pressure of said liquid is below a selected minimum pressure.

10. A gear driven rotary sprinkler comprising:
a base defining a liquid inlet;
a sprinkler head which is rotatable about a rotation axis fixed in the base;
liquid driven gear means for driving the sprinkler head in rotation about the rotation axis; and
a liquid flow pathway from the liquid inlet to the sprinkler head including suctioning apertures operative to draw sediment from the liquid driven gear apparatus by venturi action and to flush it from the sprinkler.

11. Apparatus according to claim 10, and also including a pressure responsive valve connected to said inlet, for preventing entry of a liquid into said sprinkler when the pressure of said liquid is below a selected minimum pressure.

12. A sprinkler assembly comprising:
a gear driven rotary sprinkler including
a base defining a liquid inlet,
a sprinkler head which is rotatable about a rotation axis fixed in the base,
liquid driven gear means for driving the sprinkler head in rotation about the rotation axis,
clutch apparatus for selectably decoupling the sprinkler head from the gear apparatus upon forced rotation of the sprinkler head,
means for selectably limiting the azimuth of rotation including an over-center spring mechanism, and
a liquid flow pathway from the liquid inlet to the sprinkler head including suctioning apertures operative to draw sediment from the liquid driven gear apparatus by venturi action and to flush it from the sprinkler; and
means for selectably limiting the acumulated volumetric flow of liquid through said sprinkler assembly, coupled to said liquid inlet.

13. An assembly according to claim 12, and wherein said means for selectably limiting the azimuth of rotation comprises a joined leaf spring and flow director arranged to have two alternative positions.

14. An assembly according to claim 13, and wherein said joined leaf spring and said flow director are integrally formed.

15. An assembly according to claim 14, and also including a pressure responsive valve connected to said inlet, for preventing entry of the liquid into said sprinkler when the pressure of said liquid is below a selected minimum pressure.

16. A sprinkler assembly comprising:
a gear driven rotary sprinkler including
a base defining a liquid inlet;
a sprinkler head which is rotatable about a rotation axis fixed in the base;
liquid driven gear means for driving the sprinkler head in rotation about the rotation axis; and
means for selectably limiting the azimuth of rotation including an over-center spring mechanism including an integrally formed, fixedly joined leaf spring and flow director arranged to have only two discrete alternative positions, wherein said leaf spring has a longitudinal axis and is bendable over said longitudinal axis so as to cause said flow director to be incapable of assuming a position other than one of said two alternative discrete positions; and means for selectably limiting the accumulated volumetric flow of liquid through said sprinkler assembly, coupled to said liquid inlet.

17. An assembly according to claim 16, and also including a pressure responsive valve connected to said inlet, for preventing entry of the liquid into said sprinkler when the pressure of said liquid is below a selected minimum pressure.

* * * * *

UNITED STATES PATENT AND TRADEMARK OFFICE

CERTIFICATE OF CORRECTION

PATENT NO. : 5,031,833

DATED : July 16, 1991

INVENTOR(S) : Alkalay et al

It is certified that error appears in the above-identified patent and that said Letters Patent is hereby corrected as shown below:

TITLE PAGE, left column, item [73]

Amend Assignee to read -- NAAN MECHANICAL WORKS

Kibbutz Naan, Israel, 73263--

Signed and Sealed this

Fourth Day of May, 1993

Attest:

Michael K. Kirk

MICHAEL K. KIRK

*Attesting Officer* *Acting Commissioner of Patents and Trademarks*